US010746044B2

(12) United States Patent
Tantot et al.

(10) Patent No.: US 10,746,044 B2
(45) Date of Patent: Aug. 18, 2020

(54) AIRCRAFT COMPRISING A TURBOJET ENGINE INTEGRATED INTO THE REAR FUSELAGE COMPRISING A FAIRING ALLOWING THE EJECTION OF BLADES

(71) Applicant: SAFRAN AIRCRAFT ENGINES, Paris (FR)

(72) Inventors: Nicolas Jerome Jean Tantot, Paris (FR); Michael Sauve, Nandy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 481 days.

(21) Appl. No.: 15/659,546

(22) Filed: Jul. 25, 2017

(65) Prior Publication Data
US 2018/0030852 A1  Feb. 1, 2018

(30) Foreign Application Priority Data

Jul. 26, 2016  (FR) ...................................... 16 57186

(51) Int. Cl.
*F01D 21/04*  (2006.01)
*B64D 29/04*  (2006.01)
(Continued)

(52) U.S. Cl.
CPC .......... *F01D 21/045* (2013.01); *B64D 27/02* (2013.01); *B64D 27/14* (2013.01); *B64D 27/20* (2013.01);
(Continued)

(58) Field of Classification Search
CPC ........ B64D 29/04; B64D 27/02; B64D 27/08; B64D 27/14; B64D 27/20; F01D 21/045
See application file for complete search history.

(56) References Cited

U.S. PATENT DOCUMENTS

| 2014/0054413 A1* | 2/2014 | Cazals | B64D 27/14 244/54 |
| 2015/0291285 A1* | 10/2015 | Gallet | F01D 13/02 415/60 |

FOREIGN PATENT DOCUMENTS

| EP | 0184962 A1 | 6/1986 |
| FR | 2997681 A1 | 5/2014 |
| FR | 3030445 A1 | 6/2016 |

OTHER PUBLICATIONS

French Search Report with English language translation cover sheet, dated Mar. 21, 2017, FR Application No. 1657186 (9 pages).

* cited by examiner

*Primary Examiner* — Philip J Bonzell
*Assistant Examiner* — Tye William Abell
(74) *Attorney, Agent, or Firm* — Womble Bond Dickinson (US) LLP

(57) ABSTRACT

The invention relates to an aircraft comprising a fuselage, flight control surfaces and a turbojet engine (20) integrated into the rear of said fuselage in the extension thereof, the turbojet engine (12) comprising two gas generators (22) that supply, via a common central duct (30), a power turbine (32) comprising two counter-rotating rotors (34, 36) respectively driving two upstream (38) and downstream (40) coaxial and counter-rotating fans each comprising a ring of vanes (42, 44), the set of fans (38, 40) being integrated into a fairing (46) of the turbojet engine (20) formed at the rear of the fuselage (12), characterised in that at least said fairing (46) is axially arranged behind the flight control surfaces and comprises an upstream section (50), surrounding the upstream fan (38), configured to be radially traversed by at least one fragment (43) of a vane (42) of the upstream fan (38) in the event of the breakage of a vane (42) of said (Continued)

upstream fan (38) and the ejection of said at least one fragment (43).

10 Claims, 5 Drawing Sheets

(51) Int. Cl.
    *B64D 27/26*     (2006.01)
    *B64D 27/02*     (2006.01)
    *F01D 1/24*     (2006.01)
    *B64D 27/14*     (2006.01)
    *B64D 27/20*     (2006.01)
    *F02K 3/072*     (2006.01)
    *F04D 29/52*     (2006.01)

(52) U.S. Cl.
    CPC ............. *B64D 27/26* (2013.01); *B64D 29/04* (2013.01); *F01D 1/24* (2013.01); *F02K 3/072* (2013.01); *F04D 29/522* (2013.01); *F05D 2220/323* (2013.01); *F05D 2240/14* (2013.01); *F05D 2240/20* (2013.01); *F05D 2250/44* (2013.01); *F05D 2270/09* (2013.01)

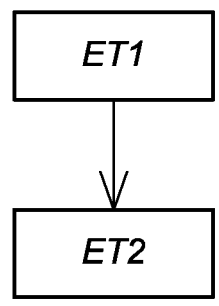
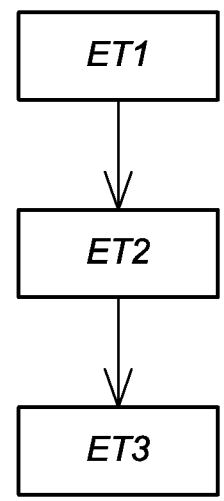
*Fig. 8*   *Fig. 9*

AIRCRAFT COMPRISING A TURBOJET ENGINE INTEGRATED INTO THE REAR FUSELAGE COMPRISING A FAIRING ALLOWING THE EJECTION OF BLADES

FIELD OF THE INVENTION AND PRIOR ART

The present invention relates to the field of aircraft, such as aeroplanes, particularly civil aeroplanes, propelled by a turbojet engine with counter-rotating fans integrated into the extension of the fuselage, downstream thereof. More particularly, it relates to the means for adapting the fans of such turbojet engines in this type of architecture to degraded operating situations that must be taken into account for safety reasons.

The patent application FR-A1-2 997 681 proposes a new aircraft architecture for reducing the noise pollution and fuel consumption of the aircraft by limiting the aerodynamic drag by means of the propulsive system absorbing and re-energising the boundary layer formed on the fuselage.

In such an architecture, an aircraft is propelled by a turbojet engine with ducted counter-rotating fans, the turbojet engine being integrated into the rear of the fuselage of the aircraft. The turbojet engine comprises at least two gas generators housed in a rear end of the fuselage that power a power turbine with two counter-rotating rotors intended to each drive a corresponding fan disposed downstream of the gas generators. The gas generators are supplied with air by distinct lateral air intakes that are disposed laterally relative to the fuselage. Downstream of the gas generators, the respective fans, called upstream and downstream fans, are disposed in the extension of the fuselage of the aircraft and are generally supplied in such a way as to absorb at least part of the boundary layer formed around the fuselage. The diameter of the fans is approximately that of the largest section of the fuselage. The rotation speed of the fans of such a turbojet engine is generally lower than it is for conventional turbine engines, particularly so that the vane head speed of the fans is subsonic. The fans are arranged in a fairing, which fulfils an aerodynamic guidance function, both in terms of the internal air flow passing through these fans and of the external air flow that flows over the fairing.

Such a turbojet engine can be used as a single engine for the aircraft on which it is mounted, or as a main engine, with this turbojet engine then being assisted in its task by two conventional auxiliary turbine engines placed under the wings of the aircraft. In this case, the turbojet engine and the turbine engines are selectively used as a function of the various flight phases of the aircraft, the auxiliary turbine engines only being used, for example, when additional thrust is required, as is the case during take-off, and the main turbojet engine being used during the cruising flight phases.

As is the case for a conventional turbojet engine, a turbojet engine that is placed in the extension of the fuselage of an aircraft can experience a failure. For example, one of the two fans can lose a vane. This phenomenon, even though it is rarely caused by ingesting a bird due to the position of the turbojet engine in the extension of the fuselage of the aircraft, nevertheless can occur if faults occur in the material of a vane. The loss of one or more fan blades risks damaging the entire turbojet engine. In this case, the rotation of the rotor of the affected fan needs to be limited to allow the aircraft to reach an airport without significantly affecting its flight capability.

Although, in a conventional aircraft comprising a turbine engine that is axially arranged relative to the fuselage, it is desirable, as is disclosed in documents FR-3030445 and EP-0184962-A1, for a turbine engine to be provided that comprises means for retaining blades when they break in order to prevent them from damaging the fuselage, the same cannot be said for an aircraft comprising a turbine engine integrated into the rear of the fuselage of the aircraft.

Indeed, in this case, the loss of a fan blade is particularly harmful when it relates to the upstream fan of the turbojet engine. The loss of one or more blades of the upstream fan can result in said blades being guided by the fairing to the downstream fan, which can result in the destruction of the downstream fan and, consequently, cause a complete loss of the propulsive capability of the turbojet engine.

This eventuality is not permissible when the turbojet engine is the only means of propelling the aircraft.

The object of the present invention is to propose a turbojet engine having the aforementioned characteristics and allowing any damage to the downstream fan to be avoided following the loss of a blade of the upstream fan. Indeed, the loss of a blade of the downstream fan is not, for its part, directly detrimental to the safety of the aircraft, since there is no risk of the blades of the downstream fan, or the debris of the blades, which are subject to the air flow, being carried towards the upstream fan, and thus they cannot cause any significant damage to the upstream fan.

A secondary aim of the invention is to maintain satisfactory aerodynamic behaviour of the turbojet engine following the loss of a blade of the upstream fan.

DISCLOSURE OF THE INVENTION

To this end, the invention proposes an aircraft comprising a turbojet engine integrated into the rear of the fuselage of the aircraft and equipped with means that allow the radial ejection of any debris from a vane that is likely to break, so as to prevent this vane or fragments of this vane from being carried towards the downstream fan.

To this end, the invention proposes an aircraft comprising a fuselage, flight control surfaces and a turbojet engine integrated into the rear of said fuselage in the extension thereof, the turbojet engine comprising at least two gas generators that supply, via a common central duct, a power turbine comprising two counter-rotating rotors respectively driving two upstream and downstream coaxial and counter-rotating fans each comprising a ring of vanes, the set of fans being integrated into a fairing of the turbojet engine formed at the rear of the fuselage, characterised in that at least said fairing is axially arranged behind the flight control surfaces and comprises an upstream section, surrounding the upstream fan, configured to be radially traversed by at least one fragment of a vane of the upstream fan in the event of the breakage of a vane of said upstream fan and the ejection of said at least one fragment.

This configuration advantageously allows the ejection, in a substantially radial direction, of any fragment of a vane that is likely to break, so as to prevent it from being carried towards the downstream fan and risking damage to said fan. Furthermore, this configuration also ensures that no vane fragment is ejected towards the flight control surfaces of the aircraft and that there is no risk of it making contact with and damaging said surfaces.

According to a further feature of the invention, the upstream section of fairing is configured to be at least partially ripped by the passage of said at least one vane fragment when it passes through said upstream section of fairing.

Furthermore, the invention proposes an aircraft comprising remedial means for partially restoring the aerodynamic guidance function of the fan fairing after it has been ripped by the fragments of this vane.

Therefore, according to a further feature of the invention, the fairing comprises at least one remedial casing, which is capable of being deployed over any ripped section of the upstream section of fairing.

Advantageously, the remedial casing comprises a plurality of angular segments of remedial casing, angularly distributed about the axis of the fairing, each of which can move between a retracted position, in which it is stowed in a housing of the fairing formed beyond the upstream section of said fairing, and a deployed position, in which it extends in line with the upstream section of fairing, substantially in the extension of the fairing, in order to plug said ripped section.

The aircraft further comprises a remedial casing system comprising means for controlling the remedial casing, which means are configured to be activated at least in response to information relating to the breakage of a vane of the upstream fan, and means for detecting the breakage of an upstream vane capable of providing said information.

Advantageously, the means for controlling the remedial casing comprise means for deploying each angular segment.

According to a particular embodiment of the invention, the system for controlling the remedial casing comprises means for identifying the angular position of any ripped section of the upstream section of fairing, which means are capable of providing position information of any ripped section, and the means for controlling the remedial casing are configured to selectively activate the means for deploying each angular sector associated with a ripped section of the upstream section of fairing in response to said position information.

The invention further relates to a turbojet engine comprising two counter-rotating rotors respectively driving two upstream and downstream coaxial and counter-rotating fans each comprising a ring of vanes, the set of fans being integrated into a fairing of the turbojet engine. This turbojet engine is characterised in that said fairing comprises at least one remedial casing that is capable of being deployed over any section of the upstream fairing that is likely to be radially traversed and at least partially ripped by a vane fragment of the upstream fan, in order to plug the corresponding ripped section.

The invention further relates to a method for controlling an aircraft remedial casing system of the type previously described, characterised in that it comprises a first step, during which the means for detecting the breakage of an upstream vane detect the breakage of at least one vane of the upstream fan, and a second step, which is determined by the first step, during which the control means control the deployment of the remedial casing.

The invention further relates to a method, by way of a variant, for controlling an aircraft remedial casing system of the type previously described, characterised in that it comprises a first step, during which the means for detecting the breakage of an upstream vane detect the breakage of at least one vane of the upstream fan, a second step, during which the means for identifying the angular position of any ripped section of the upstream section of fairing detect the position of any ripped section of the upstream section of fairing, and a third step, which is determined by the first and second steps, during which the control means selectively activate the means for deploying each angular sector associated with a ripped section of the upstream section of fairing.

BRIEF DESCRIPTION OF THE DRAWINGS

The present invention will be better understood, and further details, features and advantages of the present invention will become more clearly apparent, upon reading the following description of a non-limiting example, with reference to the accompanying drawings, in which:

FIG. 8 is a flow diagram representing a method for controlling the remedial casing system according to the first embodiment of the invention;

FIG. 9 is a flow diagram representing a method for controlling the remedial system according to the second embodiment of the invention.

DESCRIPTION OF AN EMBODIMENT

Figure 1:
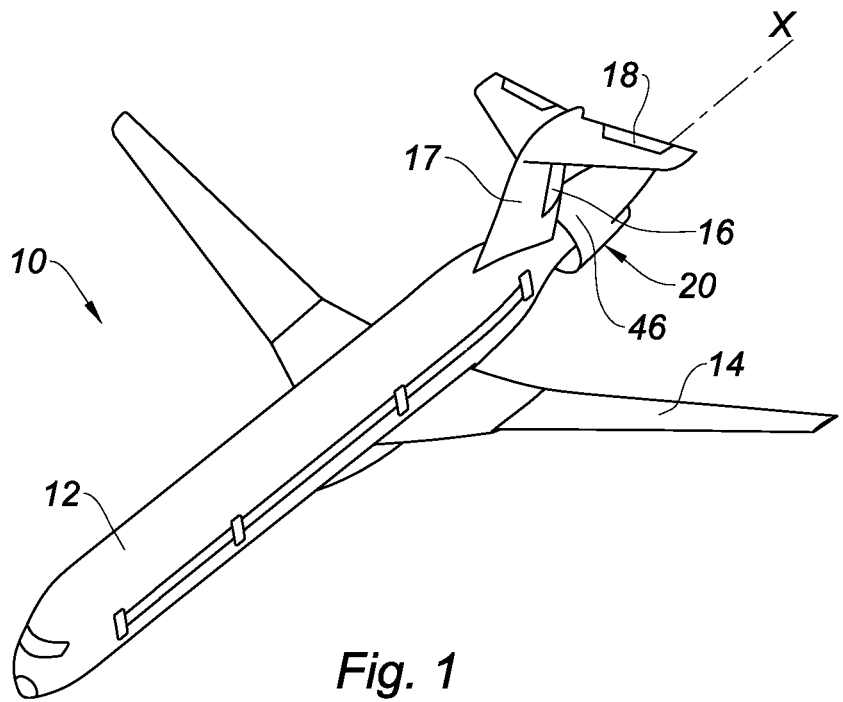
FIG. 1 is a perspective view of an aircraft produced according to the prior art.

FIG. 1 shows an aircraft 10 produced according to the prior art.

As shown in FIG. 1, the aircraft 10 comprises a fuselage 12, wings 14 extending from the fuselage 12 and, at a rear end or tail of the fuselage 12, a turbojet engine 20 integrated into the extension of the fuselage 12, substantially coaxial to an axis X-X of the fuselage 12. In front of the turbojet engine 20, the aircraft 10 comprises flight control surfaces comprising a fin 17 supporting a rudder 16 and elevators 18 that partially extend above the turbojet engine 20.

Throughout the remainder of this description, the terms axial and radial refer to the axis X-X of the fuselage 12 and the turbojet engine 20. Similarly, the terms upstream and downstream refer to the direction of the main flow along this axis X-X.

The aircraft 10 shown in FIG. 1 comprises a single turbojet engine 20 that forms the main engine of the aircraft. It is to be noted that aircraft 10 nevertheless also exist that are equipped with turbojet engines of this type and with conventional turbine engines additionally attached under the wings 14, these conventional turbine engines being used as auxiliary engines for certain flight phases of the aircraft, for example during aircraft 10 take-off, in order to provide additional thrust, while the turbojet engine 20, for its part, is more specifically dedicated to the cruising flight phases.

Figure 2:
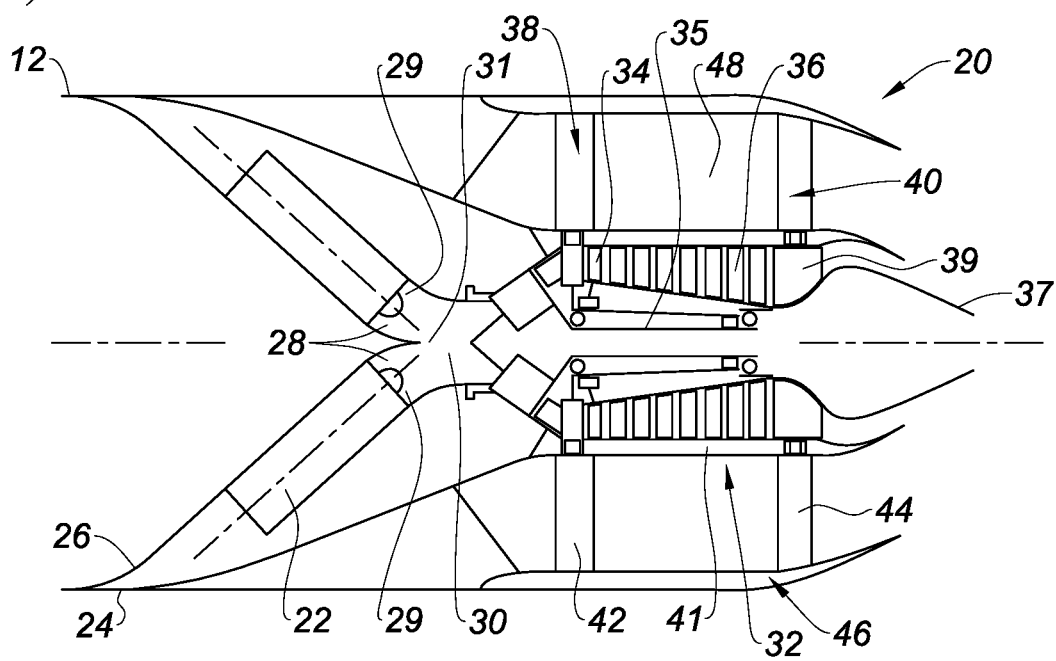
FIG. 2 is a schematic section view of a turbojet engine according to the prior art equipping the aircraft of FIG. 1.

As is more particularly shown in FIG. 2, such a turbojet engine 20 comprises two gas generators 22, which are, in this example, supplied with air collected from the surface of the fuselage 12 by means of respective openings 24 forming air intakes and by means of respective conduits 26.

The openings 24 thus absorb part of the boundary layer formed around the fuselage 12 of the aircraft 10. In another configuration, not shown, the openings 20 supplying each of the gas generators 22 conversely can be separated from the fuselage 12 of the aircraft, so as to minimise this phenomenon of absorbing the boundary layer and to facilitate the operation of the gas generators 22. The use of more than two gas generators 22 can also be contemplated.

In a manner per se known, each gas generator 22 comprises at least one compressor, one combustion chamber and one turbine (not shown in FIG. 2).

The gas generators 22 supply, via respective conduits 28 delimiting two primary ducts 29, a common central duct 30 sending the flow of combustion gases generated by the gas generators 22 to a power turbine 32. Preferably, the two primary flow ducts 29 of the gas generators 22 converge on the longitudinal axis X-X and together form an open 'V' in the upstream direction, the angle of opening of which is preferably between 80° and 120°.

The two primary flow ducts 29 of the gas generators 22 converge in the central duct 30 that supplies the power turbine 32. A mixer (not shown in the figures) is preferably located in the vicinity of a convergence zone 31 of the two primary ducts 29. The purpose of this mixer is to mix the gas flows coming from the two gas generators 22 in order to generate a single homogeneous gas flow at the output of the central duct 30.

The power turbine 32 comprises two counter-rotating rotors 34, 36 respectively driving two upstream 38 and downstream 40 coaxial and counter-rotating fans. The turbine rotors 34, 36 are coaxial and are centred on the longitudinal axis X-X. They rotate about a central casing 35 fixed to the aircraft structure. Downstream of the power turbine 32, the radially internal section of the rotor 34 extends via a central body 37. Furthermore, it is connected, by support arms 39, to a ring 41 for supporting the vanes 44 of the downstream fan 40. Moreover, this ring 41 comprises a rearwards extension, so as to form, with the central body 37, a primary ejection nozzle at the output of the power turbine 32.

The upstream fan 38 comprises a ring of vanes 42 and the downstream fan 40 comprises a ring of vanes 44.

In a known manner, the set of fans 38, 40 is integrated into a fairing 46 of the turbojet engine that is formed at the rear of the fuselage 12. The fairing 46 is conventionally arranged in the extension of the fuselage 12, as shown in FIGS. 1 and 2.

This design raises safety problems in the event of the breakage of one or more blades of the front fan 38.

Indeed, the fairing 46 conventionally is a substantially rigid fairing that provides, on the one hand, aerodynamic functions, since it is intended to guide an air flow into a secondary air duct 48 passing through the fans 38, 40 and, on the other hand, structural functions, particularly with a view to allowing vane debris to be retained in the event of a failure of the upstream fan 38.

For this reason, in the event of the breakage of a vane 42 of the upstream fan 38, the fairing 46 is likely to guide fragments 43 of the broken vane 42 towards the downstream fan 40, which they can penetrate and in which they can cause considerable damage. This damage can even destroy the downstream fan 40, which can result in the complete loss of the propulsive capability of the turbojet engine 20. This risk is unacceptable, particularly when the turbojet engine 20 forms the main engine of the aircraft 10, in which case a deficiency in said turbojet engine 20 cannot be overcome by the use of auxiliary turbine engines.

The invention overcomes this disadvantage by proposing a new design for the aircraft 10 and, in particular, for the turbojet engine 20 that is able to prevent broken vanes 42 or fragments of vanes originating from the upstream fan 38 from being sent into the secondary duct 48, so as to avoid any risk of damage to the downstream fan 40.

Figure 3:
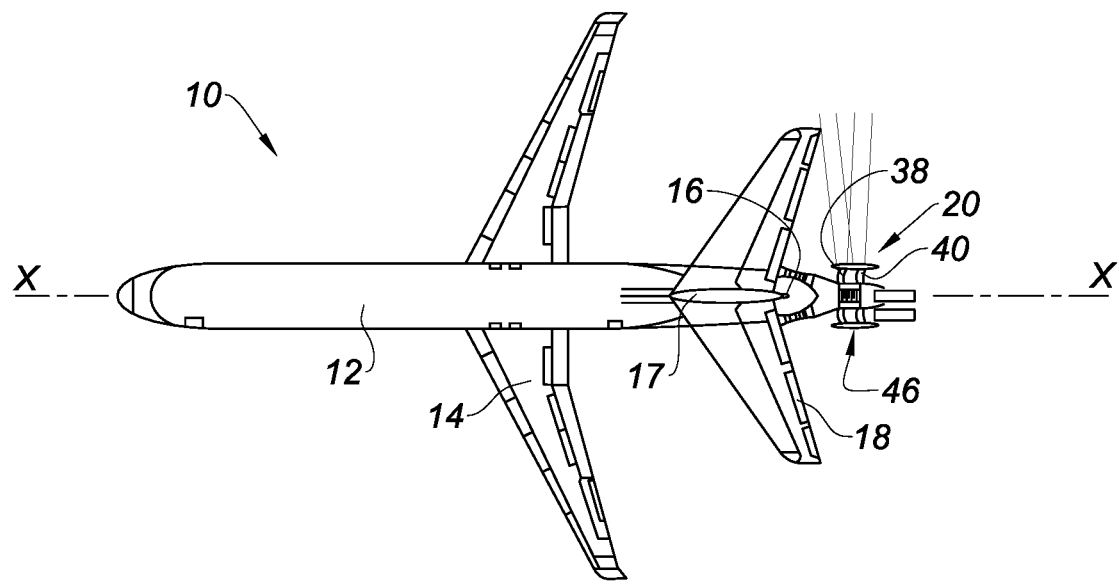
FIG. 3 is a top view of an aircraft produced according to the invention.

An aircraft 10 produced according to the invention has been shown in FIG. 3.

The aircraft 10 comprises, as before, a fuselage 12, wings 14 extending from the fuselage 12 and, at a rear end or tail of the fuselage 12, flight control surfaces comprising a rudder 16 and elevators 18. The aircraft 10 comprises a main turbojet engine 20 integrated into the rear of its fuselage 12 in the extension thereof. The turbojet engine 20 is arranged substantially coaxial to an axis X-X of the fuselage 12. As before, the turbojet engine 20 can be assisted by auxiliary turbine engines (not shown) that are placed under the wings 14 of the aircraft 10.

According to the invention, the fairing 46 of the turbojet engine 20 is axially arranged behind the flight control surfaces 16, 18, i.e. so that the upstream fan 38 and the downstream fan 40 are also arranged behind the flight control surfaces 16, 18.

Figure 4:
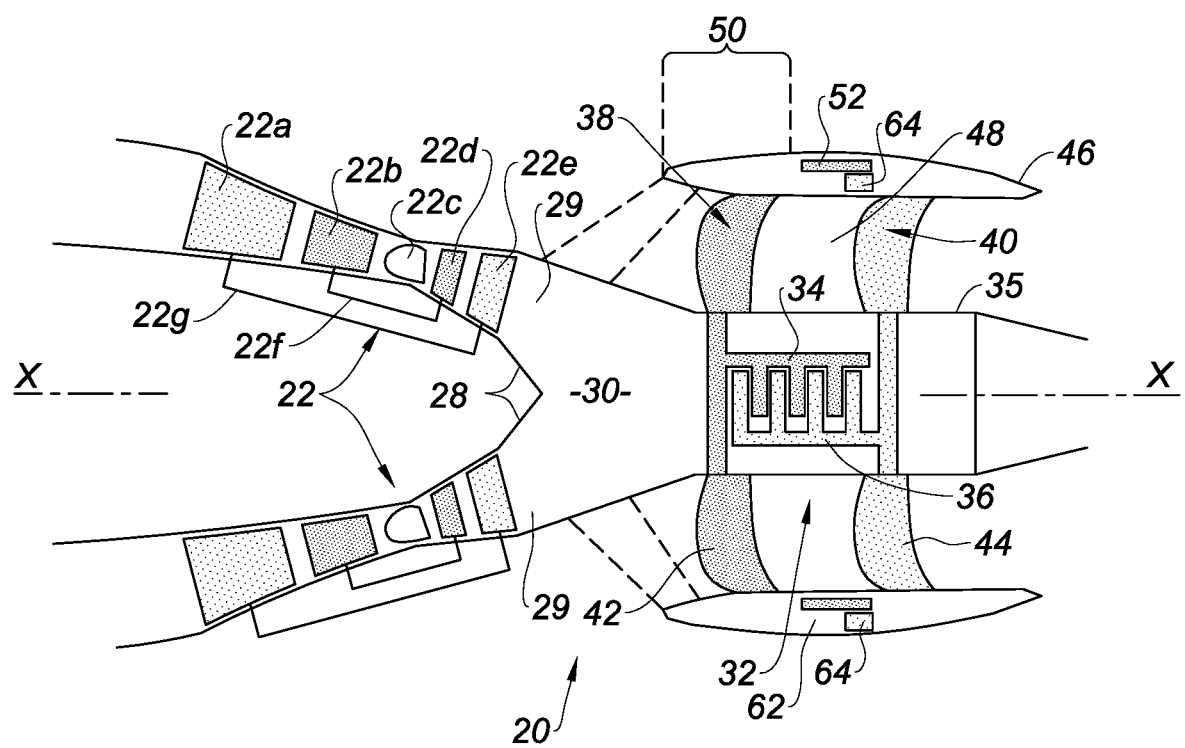
FIG. 4 is a schematic section view of a turbojet engine according to first and second embodiments of the invention equipping the aircraft of FIG. 3 during a normal operating phase.

More specifically, as shown in FIG. 4, a turbojet engine 20 according to the invention comprises, as before, two gas generators 22, each of which is placed in a primary duct 29, said generators being supplied with air that is, by way of example and in a manner that by no means limits the invention, collected on the surface of the fuselage (not shown). For example, each gas generator 22 comprises at least one low-pressure LP compressor 22a, one high-pressure HP compressor 22b, one combustion chamber 22c, one high-pressure HP turbine 22d and one low-pressure LP turbine 22e. The LP compressor 22a and the LP turbine 22e are connected to each other by a low-pressure LP shaft 22f, and the HP compressor 22B and the HP turbine 22d are connected to each other by a high-pressure HP shaft 22g, which are schematically shown in FIG. 4. The gas generators 22 supply, by means of respective conduits 28 delimiting the two primary ducts 29, a common central duct 30 sending the flow of combustion gases generated by the gas generators 22 into the power turbine 32, like the previous configuration. The power turbine 32 comprises two counter-rotating rotors 34, 36 respectively driving two fans 38, 40, which rotate about a central casing 35 fixed to the aircraft structure and which are surrounded by the fairing 46.

Furthermore, the fairing 46 comprises an upstream section 50, surrounding the upstream fan 38, that is configured to be radially traversed by at least one vane fragment 43 of the upstream fan, in the event that the vane 42 of said upstream fan 38 breaks and said at least one fragment 43 is ejected.

This configuration advantageously ensures that, in the event of the breakage of one or more vanes 42 of the upstream fan 38, this one or more vane(s) 42, or their fragments 43, is/are not carried by the fairing 46 to the downstream fan 40 and consequently do not risk damaging them. Therefore, this configuration allows a propulsive capability to be maintained for the downstream fan 40 even when the upstream fan 38 is damaged.

It is worthwhile noting that this configuration specifically addresses the upstream section 50 of the fairing 46, since it is only in the event of the breakage of a vane 42 of the upstream fan 38 that the turbojet engine 20 can incur a significant risk, with any breakage of a vane 44 of the downstream fan 40 causing the loss of the propulsive capabilities of said downstream fan 40 but not risking any damage being caused to the upstream fan 38, so that the turbojet engine 20 would still be mainly operational.

The upstream section 50 of the fairing 46, through which a vane 42 fragment 43 can pass, can be produced in any known manner of the prior art. For example, a vane 42 fragment 43 can pass through the upstream section 50 of the fairing 46 in a non-destructive manner and, to this end, equipping this upstream section 50 with movable walls able to avoid the passage of the vane 42 fragments and then resume their position can be contemplated.

Figure 6:
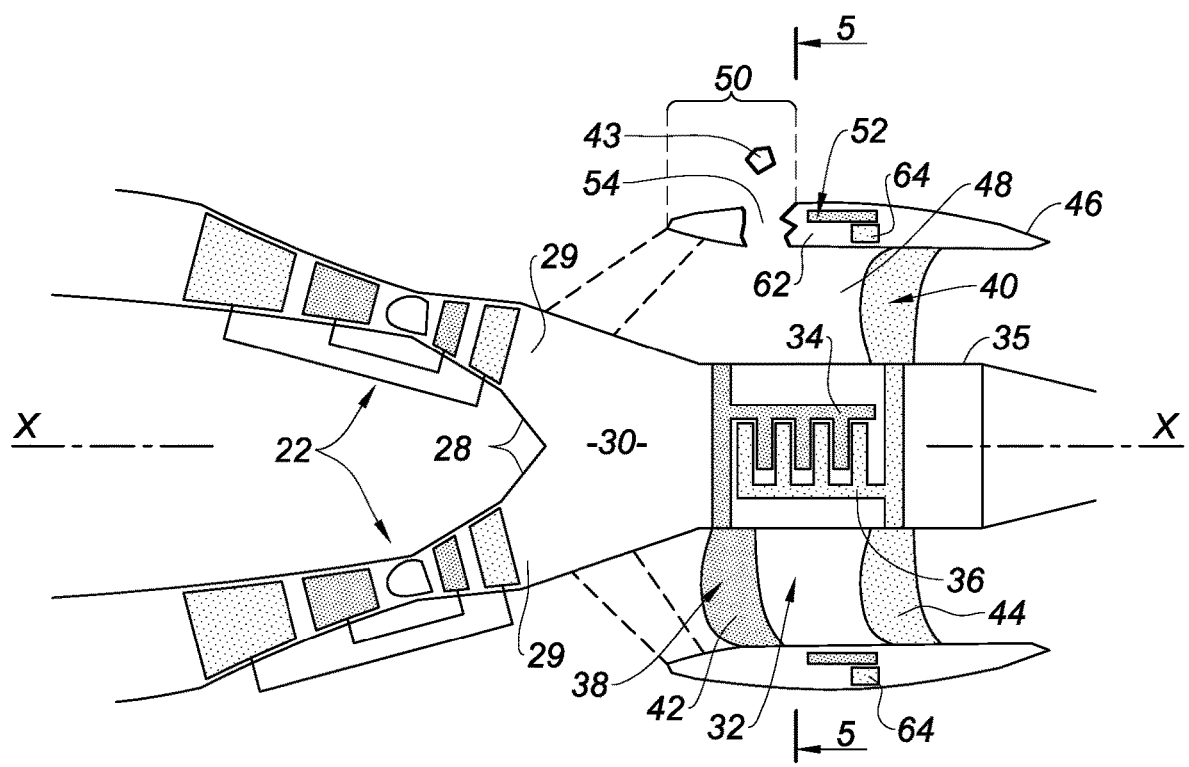
FIG. 6 is a schematic section view of the turbojet engine of FIG. 4 during a phase of losing a blade of the upstream fan.

However, in the preferred embodiment of the invention, the upstream section of fairing 50 is configured to be at least partially ripped by the passage of said at least one fragment 43 of a vane 42 when it passes through said upstream section 50 of fairing 46, as shown in FIG. 6.

Ripping is understood in its widest sense to be any damage made to the integrity of the upstream section 50 of the fairing 46 that causes an opening to appear through the fairing 46, by analogy with the vocabulary used in shipbuilding. For example, a rip in the fairing in most cases will correspond to the perforation of this fairing by a vane fragment or to the tearing of part of this fairing by a vane fragment.

The fairing 46 is then a fairing known as a "soft fairing", which must thus be stiff enough to allow the air flow to be guided into the secondary duct 48 and which nevertheless must be able to be locally ripped by the through-passage of the one or more vane 42 fragments 43 when they are radially ejected due to the rotation of the upstream fan 38. This configuration is facilitated due to the fact that, contrary to the prior art, in this case the fairing 46 is not intended to provide structural functions.

This configuration at least ensures that any breakage of a vane 42 of the upstream fan 38 will not cause any damage to the fin 17 or damage to the downstream fan 40. For this reason, the aircraft 10 maintains its propulsive and guidance capabilities, which can allow it to reach an airport.

However, the invention advantageously proposes remedial means intended to re-establish the integrity of this fairing 46, after the upstream section 50 of the fairing 46 is ripped.

Figure 5:
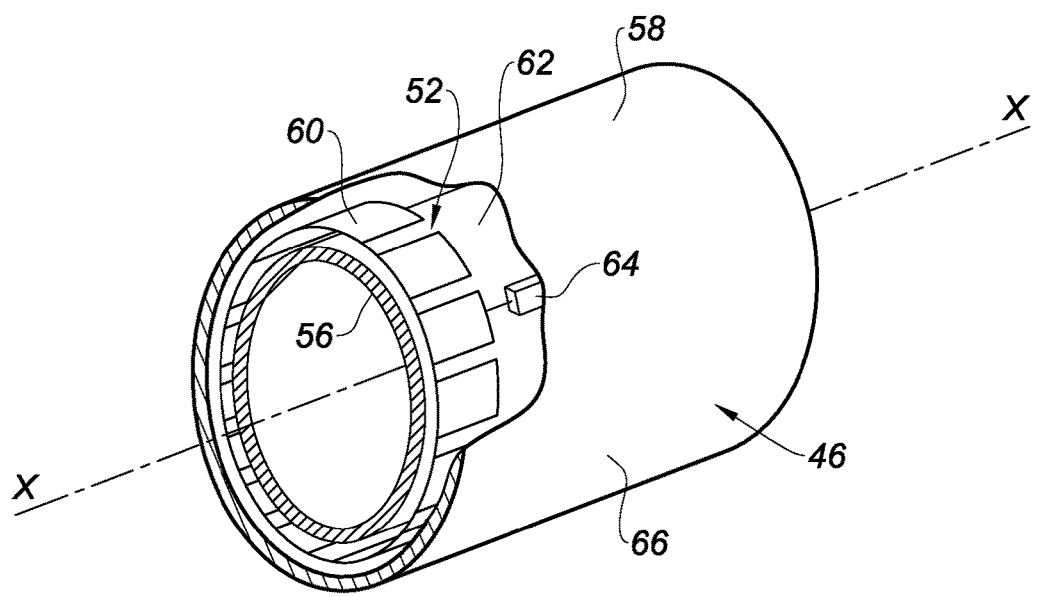
FIG. 5 is a schematic perspective cut-out view of a fairing for the turbojet engine of FIG. 4.
Figure 7A:
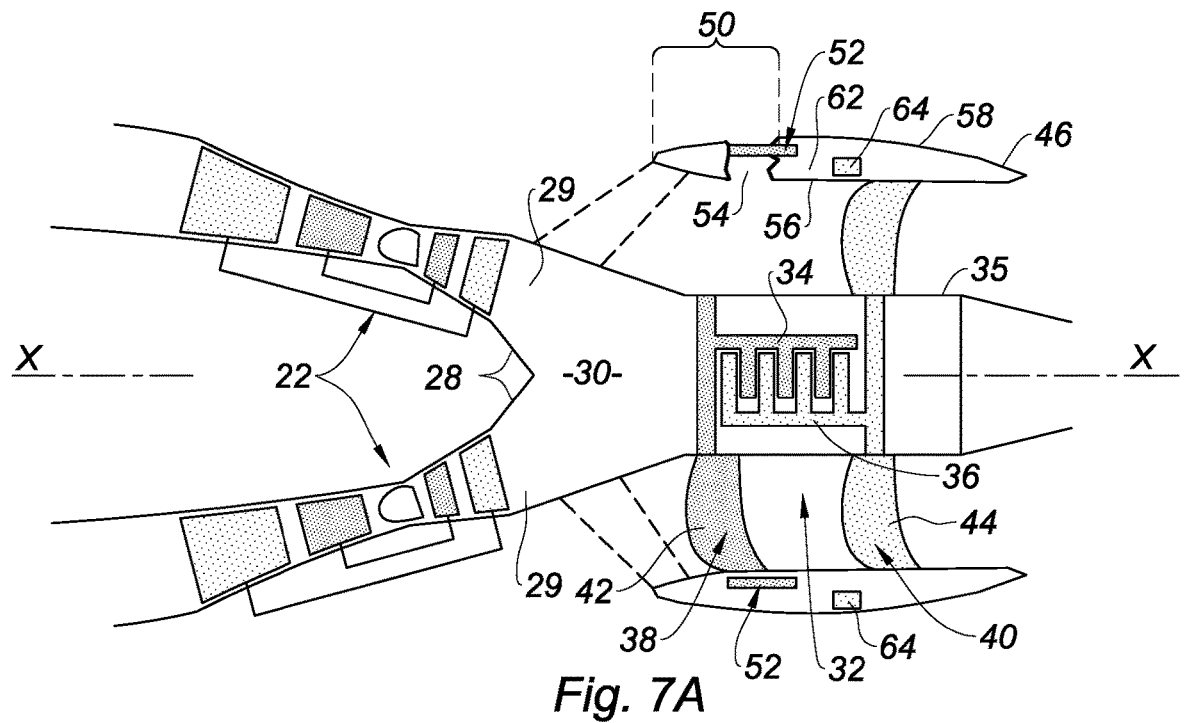
FIG. 7A is a schematic section view of the turbojet engine according to the first embodiment of the invention during a phase of deploying its remedial casing.
Figure 7B:
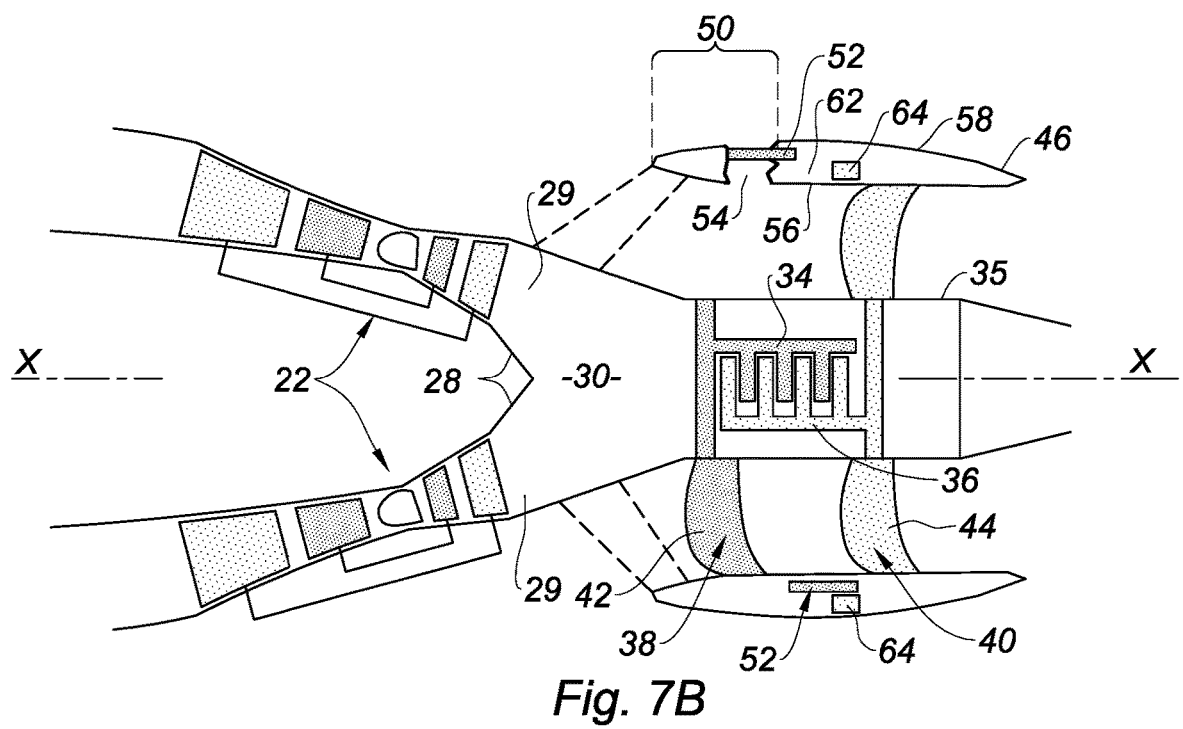
FIG. 7B is a schematic section view of the turbojet engine according to the second embodiment of the invention during a phase of deploying its remedial casing.

To this end, as shown in FIGS. 5, 7A and 7B, the fairing comprises at least one remedial casing 52, which is capable of being deployed over any ripped section 54 of the upstream section 50 of fairing 46. When it is ripped, as shown in FIGS. 7A and 7B, the fairing 46 comprises a ripped section 54, on which the remedial casing 52 can be deployed in order to plug said ripped section 54 and thus re-establish the integrity of the fairing 46.

Any embodiment of such a remedial casing 52 can be used to correctly implement the invention. The fairing 46 in a known manner comprises an inner wall 56 and an outer wall 58. For example, the remedial casing 52 can be an annular casing that is housed between the inner wall 56 and the outer wall 58 of the fairing 46, beyond the upstream section 50 of fairing, i.e. preferably in a downstream section 66 located downstream of said upstream section 50, and which is able to be axially driven upstream to plug the ripped section 54.

However, in the preferred embodiment of the invention, as shown in FIG. 5, the remedial casing 52 comprises a plurality of angular segments 60 of remedial casing, angularly distributed about the axis X-X of the fairing 46, each of which can move between a retracted position, shown in FIGS. 4 and 6, in which it is stowed in a housing 62 of the fairing 46 formed beyond the upstream section 50 of said fairing 46, and a deployed position, shown in FIGS. 7A and 7B, in which it extends in line with the upstream section 50 of fairing and, more specifically, in line with the ripped section 54, substantially in the extension of the fairing 46, in order to plug the ripped section 54.

The perspective cut-out view of FIG. 5 shows the downstream section 66 of the fairing 46 accommodating the angular segments 60 of the remedial casing 52 in its housing 62, which is arranged between the inner 56 and outer 58 walls of the fairing 46.

As can be seen, the angular segments 60 are evenly angularly distributed about the axis X-X of the fairing 46. In this case, they are shown in the retracted position, it being understood that their deployed position corresponds to an upstream displacement of these segments 60, i.e. to the left in FIG. 5.

To ensure the transition of the angular sectors 60 from their retracted position to their deployed position, the invention proposes a deployment means 64, which has been shown schematically in FIGS. 4, 6, 7A and 7B. Any known deployment means of the prior art can be used to move these angular segments 60 of remedial casing 52.

For example, one or more segments 60 can be associated with a hydraulic or electric actuator or with pyrotechnic means for ensuring rapid deployment. By way of a variant, it is also possible for these segments 60 to undergo a return force provided by a spring (not shown) and for these segments to be clamped during normal flight conditions. In this case, the segments 60 are deployed by releasing the means for clamping these segments 60 in order to allow the spring to be decompressed.

Furthermore, it will be understood that the segments 60 are mounted on sliding guide means (not shown) that allow them to be guided by sliding between the inner 56 and outer 58 walls of the fairing 46 when they move towards the upstream section 50 of the fairing 46. These sliding means can assume a plurality of forms and, since they are not the object of the present invention, they will not be described in further detail in this description.

In the preferred embodiment of the invention, the aircraft comprises a remedial casing system comprising the remedial casing 52, as well as means (not shown) for controlling the remedial casing 52. These means are configured to be activated at least as a response to information relating to the breakage of a vane 42 of the upstream fan 38, which information is provided by means (not shown) for detecting the breakage of an upstream vane capable of providing said information. The means for controlling the remedial casing comprise the means 64 for deploying the angular segments 60.

In its simplest configuration, according to a first embodiment of the invention, when the means for detecting the breakage of an upstream vane provide information representing the breakage of a vane 42 of the upstream fan 38, the control means activate the means for deploying all the sectors 60 simultaneously. This configuration has been shown in FIG. 7A. Only the sectors 60 that correspond to the ripped section 54 effectively plug this ripped section, the remaining sectors 60 being moved inside the intact section of the upstream section 50 of the fairing 46.

In this case, as shown in FIG. 8, a method for controlling the remedial casing system comprises a first step ET1, during which the means for detecting the breakage of an upstream vane 42 detect the breakage of at least one vane 42 of the upstream fan 38, and a second step ET2, which is determined by the first step ET1, during which the control means control the deployment of the remedial casing 52 and, more specifically, the integrity of these angular sectors 60.

According to a second embodiment of the invention, the system for controlling the remedial casing comprises means (not shown) for identifying the angular position of any ripped section 54 of the upstream section 50 of the fairing

48. Thus, these identification means are able to identify which angular zone of the upstream section 50 of the fairing 52 is actually damaged by a rip and includes a ripped section 54 and are able to provide information representing this position that allows selective control of the angular sectors 60 to be performed. Thus, on the basis of this position information of any ripped section 54, the means for controlling the remedial casing selectively activate the means 64 for deploying each angular sector 60 associated with a ripped section 54 of the upstream section 50 of fairing 52, which avoids the unwanted deployment of the sectors 60 for which deployment is not necessary and consequently saves the energy that is associated with their deployment.

This configuration proves to be particularly advantageous when the deployment of the angular sectors 60 is provided by pyrotechnic deployment means 64 that need to be replaced once they have been used. Once the aircraft 10 has returned to its base, the turbojet engine 20 undergoes a maintenance operation to replace the ripped section 54 of the upstream section 50 of fairing, the damaged elements of the upstream fan 38 and only the pyrotechnic deployment means 64 that have been used.

In this case, as shown in FIG. 9, a method for controlling the remedial casing system comprises a first step ET1, during which the means for detecting the breakage of an upstream vane 42 detect the breakage of at least one vane 42 of the upstream fan 38, a second step ET2, during which the means for identifying the angular position of any ripped section 54 of the upstream section 50 of the fairing 46 detect the position of any ripped section 54 of the upstream section 50 of fairing 46, and a third step ET3, which is determined by the first and second steps ET1 and ET2, during which the control means selectively activate the means 64 for deploying each angular sector 60 associated with a ripped section 54 of the upstream section 50 of fairing.

The invention is particularly applicable to a turbojet engine 20 of the type previously described that comprises two counter-rotating rotors 34, 36 respectively driving two upstream 38 and downstream 40 coaxial and counter-rotating fans, each comprising a ring of vanes 42, 44, with the set of fans 38, 40 being integrated into a fairing 46 of the turbojet engine 20. Although the configuration of the turbojet engine 20 is not limited to the invention, it will preferably be implemented within the context of an aircraft 10, the turbojet engine 20 of which is arranged behind the fin 17 and behind the fuselage 12 in order to avoid any risk of debris 43 interacting with a vital section of the aircraft 10.

It is also to be noted that the remedial casing system can preferably be associated with control means intended to ensure the operability of the downstream fan 40, these control means particularly being intended to deactivate the upstream fan 38 and to ensure satisfactory operation of the downstream fan 40. However, since these control means are not the object of the invention, they are not described in further detail throughout this description.

The invention claimed is:

1. An aircraft comprising a fuselage, flight control surfaces and a turbojet engine integrated into the rear of said fuselage in the extension thereof, the turbojet engine comprising at least two gas generators that supply, via a common central duct, a power turbine comprising two counter-rotating rotors respectively driving two upstream and downstream coaxial and counter-rotating fans each comprising a ring of vanes, the set of fans being integrated into a fairing of the turbojet engine formed at the rear of the fuselage, wherein at least said fairing is axially arranged behind the flight control surfaces and comprises an upstream section, surrounding the upstream fan, configured to be radially traversed by any fragment of any vane of the upstream fan in the event of the breakage of said vane of said upstream fan and the ejection, in a substantially radial direction of any fragment of said vane, so as to prevent said fragment from being carried towards the downstream fan and risking damage to said downstream fan.

2. The aircraft according claim 1, wherein the upstream section of the fairing is configured to be at least partially ripped by the passage of said at least one vane fragment when said at least one vane fragment passes through said upstream section of the fairing.

3. The aircraft according to claim 2, wherein the fairing comprises at least one remedial casing, which is capable of being deployed over any ripped section of the upstream section of the fairing.

4. The aircraft according to claim 3, wherein the remedial casing comprises a plurality of angular segments of remedial casing, angularly distributed about the axis (X-X) of the fairing, each angular segment of remedial casing being able to move between a retracted position, in which said angular segment of remedial casing is stowed in a housing of the fairing formed beyond the upstream section of said fairing, and a deployed position, in which said angular segment of remedial casing extends in line with the upstream section of the fairing, substantially in the extension of the fairing, in order to plug said ripped section.

5. The aircraft according to claim 3, wherein said aircraft comprises a remedial casing system comprising the remedial casing and means for controlling the remedial casing, which means are configured to be activated at least in response to information relating to the breakage of a vane of the upstream fan, and means for detecting the breakage of an upstream vane capable of providing said information.

6. The aircraft according to claim 5, the remedial casing comprises a plurality of angular segments of remedial casing, angularly distributed about the axis (X-X) of the fairing, each angular segment of remedial casing being able to move between a retracted position, in which said angular segment of remedial casing is stowed in a housing of the fairing formed beyond the upstream section of said fairing, and a deployed position, in which said angular segment of remedial casing extends in line with the upstream section of the fairing, substantially in the extension of the fairing, in order to plug said ripped section, wherein the means for controlling the remedial casing comprise means for deploying each angular segment.

7. The aircraft according to claim 6, wherein the system for controlling the remedial casing comprises means for identifying the angular position of any ripped section of the upstream section of the fairing, which means are capable of providing position information of any ripped section, and in that the means for controlling the remedial casing are configured to selectively activate the means for deploying each angular sector associated with a ripped section of the upstream section of the fairing in response to said position information.

8. A turbojet engine comprising two counter-rotating rotors respectively driving two upstream and downstream coaxial and counter-rotating fans each comprising a ring of vanes, the set of fans being integrated into a fairing of the turbojet engine, wherein said fairing comprises at least one remedial casing capable of being deployed over any section of the upstream fairing that is likely to be radially traversed and at least partially ripped by the breakage of a vane of the upstream fan, in order to plug the corresponding ripped section.

9. A method for controlling an aircraft remedial casing system according to claim 5, wherein said method comprises a first step (ET1), during which the means for detecting the breakage of an upstream vane detect the breakage of at least one vane of the upstream fan, and a second step (ET2), which is determined by the first step (ET1), during which the control means control the deployment of the remedial casing.

10. A method for controlling an aircraft remedial casing system according to claim 7, wherein said method comprises a first step (ET1), during which the means for detecting the breakage of an upstream vane detect the breakage of at least one vane of the upstream fan, a second step (ET2), during which the means for identifying the angular position of any ripped section of the upstream section of the fairing detect the position of any ripped section of the upstream section of the fairing, and a third step (ET3), which is determined by the first and second steps (ET1, ET2), during which the control means selectively activate the means for deploying each angular sector associated with a ripped section of the upstream section of the fairing.

\* \* \* \* \*